United States Patent [19]
Eckle et al.

[11] 3,963,366
[45] June 15, 1976

[54] BORING TOOL FOR WORKING BORES OF SMALL DIAMETER

[75] Inventors: Otto Eckle, Lochgau; Hans Grzegorz, Besigheim, both of Germany

[73] Assignee: KOMET Stahlhalter-und Werkzeugfabrik, Robert Breuning GmbH, Besigheim, Germany

[22] Filed: Oct. 17, 1974

[21] Appl. No.: 515,670

[30] Foreign Application Priority Data
Oct. 29, 1973    Germany.................... 7338797[U]

[52] U.S. Cl................................. 408/199; 408/713
[51] Int. Cl.².......................................... B23B 51/00
[58] Field of Search............ 408/199, 210, 211, 213, 408/216, 226, 230, 705, 713; 29/96, 105

[56] References Cited
UNITED STATES PATENTS

| | | | |
|---|---|---|---|
| 1,887,374 | 11/1932 | Emmons | 408/713 X |
| 3,147,645 | 9/1964 | Cooper | 408/199 |
| 3,354,526 | 11/1967 | Erkfritz | 408/211 X |
| 3,376,763 | 4/1968 | Welles | 408/199 |

FOREIGN PATENTS OR APPLICATIONS

| | | | |
|---|---|---|---|
| 499,355 | 11/1970 | Switzerland | 408/199 |

*Primary Examiner*—Othell M. Simpson
*Assistant Examiner*—William R. Briggs
*Attorney, Agent, or Firm*—Woodhams, Blanchard and Flynn

[57] ABSTRACT

A boring tool for working a small diameter bore in a workpiece having a shaft of circular cross-section comprising a clamping portion for supporting the tool and a neck portion extending forwardly therefrom. The forward end of the neck portion carries a cutting plate. The cutting plate is located entirely within the circular cross-section of the neck portion, except for a cutting point on such cutting plate which extends somewhat laterally beyond the circular cross-section of the neck portion. The neck portion has a channel of semicircular cross-section which spirals from the front end thereof toward the clamping portion of the shaft, the spiral being in the directions of rotation and of feed of the workpiece with respect to the tool. In a modification, a cuttings breaker is mounted to overlie the cutting plate, extends close to the cutting point and has an axially extending cuttings breaking channel running the length thereof parallel to the axis of the neck portion and opening toward the cutting plate. Such cuttings breaking channel conveys cuttings from the cutting point to the spiral, circular cross-section cuttings channel in the neck portion.

15 Claims, 8 Drawing Figures

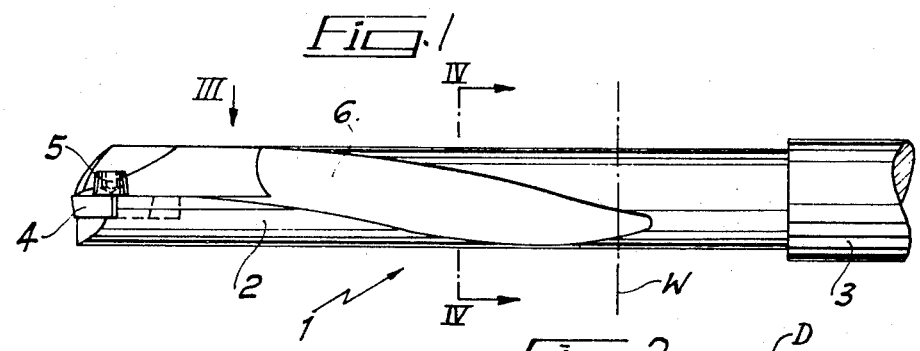
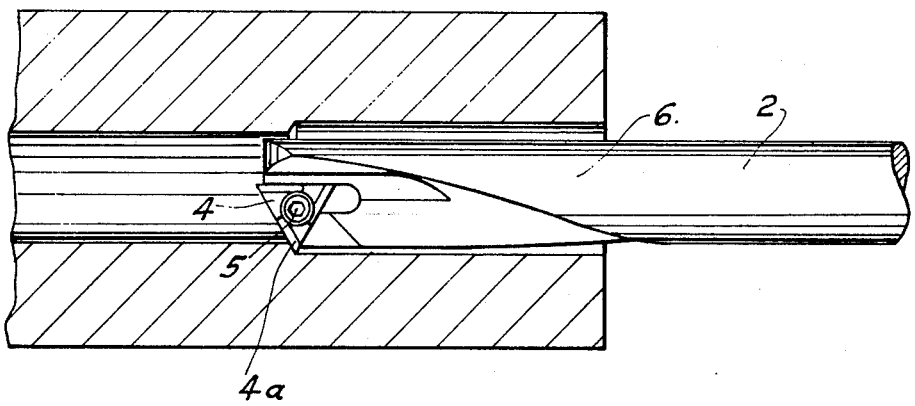
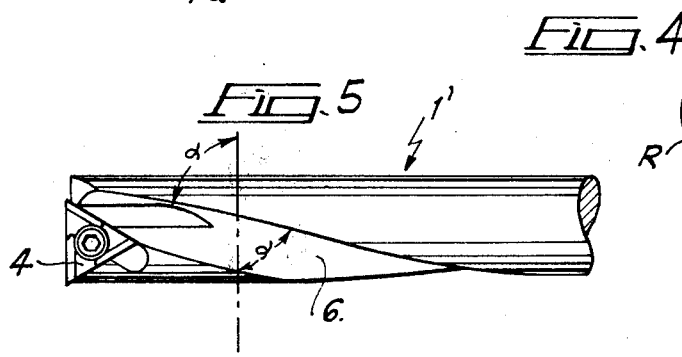

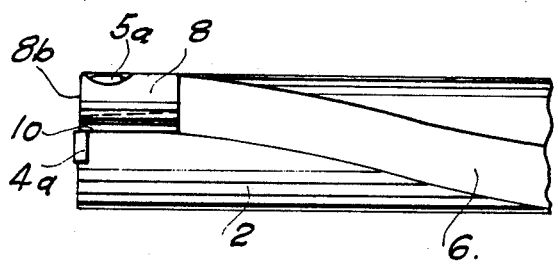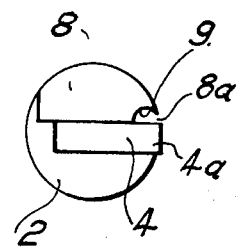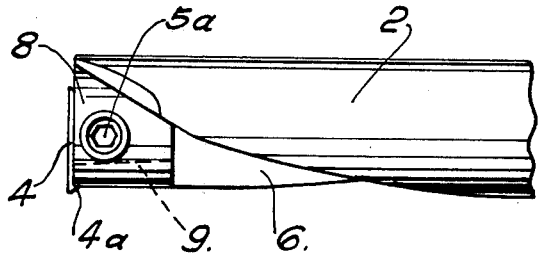

BORING TOOL FOR WORKING BORES OF SMALL DIAMETER

The invention concerns a boring tool for working bores of small diameter with a shaft of circular cross-section consisting of a clamping and a neck section where there is arranged at the forward end of the latter a cutting plate of cutting metal or the like, the cutting points of which project sideways beyond the neck section.

In known hollowing, or boring, tools of this type (see the prospectus of the application "KOMET Bohrstahlhalter and Innenbearbeitungsstähle" [KOMET boring tool holders and internal boring tools] IB 0/69/5 W) there is provided at the forward end of the neck part a head of diameter greater than the said neck part which has a nose projecting at the side. A plate of cutting metal is soldered to this nose. This design is so chosen that a sufficiently large intermediate space is left between the neck part, with tapering diameter, and the inner wall of the bore through which the cuttings can escape. The hollowing tool is considerably weakened by the tapering of the neck part relative to the head part or the clamping part. This weakening is particularly noticeable for small diameter bores, since even with small bores it is not possible to reduce the exit space intermediate between the bore and the tool below a certain minimum size of about 2 mm if the cuttings are to be able to emerge without hindrance. Therefore, the ratio of the diameters of the bore and the neck part cannot be designed in proportion to each other, but in the range of small bores the fraction occupied by the intermediate exit space must be considerably greater than with larger bores. With too small an intermediate exit space the walls of the bore may be scratched by cuttings and have unusable surfaces, cuttings may become wedged between the neck part and the bore giving rise to distortion of the neck part with consequent formation of flutings and variations in diameter. In addition build up of the cuttings with formation of tangles may occur and may lead to breaking of the cutting tool.

The basic object of the invention is to design a hollowing, or boring, tool for the working of bores of small diameter of the type described in the introduction, which is particularly stable and which ensures a trouble-free removal of the cuttings.

This is achieved according to the invention in that the cutting plate is arranged, with the exception of the cutting point which projects the furthest at the side, to be entirely within the circular cross-section of the neck part and that, where it is connected to the cutting plate, the neck part has a channel of semicircular cross-section and forming a spiral in the directions of rotation and of feed to accept the cuttings.

This design makes it possible to make the diameter of the neck section as great as is possible. The diameter may be practically equal to that of the bore to be worked since the cuttings channel serves for the removal of the cuttings and it is only necessary that sufficient space should remain between the neck part and the inner wall of the bore to prevent the neck part from scraping against the inner wall. In this case it is only necessary that the cutting point should project very slightly from the circular cross-section of the neck part. The formation of curved cuttings in spiral form is encouraged on account of the semicircular cross-section of the cuttings channel. Whether the work-piece rotates and the hollowing tool remains stationary or the reverse, the spiralling of the cuttings channel in the directions of rotation and of feed has the result that the uunavoidable contact between the cuttings and the wall of the bore produces frictional forces whose effect, throughout the length of the spiral cuttings channel, always promotes the movement of the cuttings forward in the direction of the outlet from the bore.

The rotary tool according to the invention is advantageously so designed that the spiralling of the cuttings channel extends, at a maximum, over a third of the pitch. The greatest possible stability is achieved thus together with the optimum removal of cuttings, which is particularly effective when the hollowing tool is arranged horizontally. Such a horizontal arrangement with horizontal feed direction is usual in rotary machines and boring plants. As a rule in the working of small bores the workpiece rotates and the tool is stationary (rotary machines, capstan rotary machines, automatic lathes). In these cases the removal of cuttings usually takes place in a horizontal plane passing through the axis of the bore. In such a case the cuttings channel begins in the horizontal direction and then turns with an increasingly great downward slope until the end of the cuttings channel is so arranged as to be directed downwards outside the bore, so that the cuttings can fall out of the cuttings channel under the effect of gravity. With serial work in which the dimensions of the bore are always constant it is possible to adjust the pitch of the cuttings channel so that the cuttings channel is directed downwards exactly at the point at which it projects from the workpiece when the finished depth of bore is attained.

Further possibilities of embodiment are characterized in the subclaims.

The invention is described in more detail in the following with reference to the examples of embodiment illustrated in the drawing.

It shows:

FIG. 1 a side view of the new hollowing, or boring, tool,

FIG. 2 a front view of the same,

FIG. 3 a plan view in the direction III of FIG. 1,

FIG. 4 a section along the line IV—IV of FIG. 1,

FIG. 5 a second example of embodiment, in the form of a so-called hollowing corner tool, FIG. 6 a side view of a third example of embodiment, FIG. 7 a plan view of the same, FIG. 8 a front view.

In the drawing 1 indicates the whole hollowing, or boring, tool whose shaft consists of a neck part 2 and a clamping part 3. The latter serves to clamp the hollowing tool. A triangular cutting plate 4 of cutting metal or the like is mounted at the front end of the neck part 2. The cutting plate is provided, in a known manner, with three cutters and after one cutter is worn it can, in each case, be reorientated so that a new cutter is brought into the working position which can be achieved by loosening and tightening up the fixing screw 5. As can be seen most clearly in FIG. 2, the cutting plate 4, with the exception of the cutting point 4a which projects furthest outwards at the side, is arranged so as to be entirely within the circular cross-section of the neck part. In this case the cutting point only needs to project about ½ mm or less beyond the circular cross-section. This projection certainly appears to be greater in the drawing but the tool is shown here approximately at twice the actual size.

Finally the neck part 2 has a spiralled channel 6 for cuttings with a substantially semicircular cross-section at the cutting plate 4, which can be most clearly seen in FIG. 4. The radius r of the cross-section of the cuttings channel should here be about 0.4 to 0.6 of the radius R of the neck part. Use of the first-named value gives the greatest possible stability and use of the second value the greatest possible space for cuttings.

As can be seen in FIG. 1, the spiralling of the cuttings channel extends at its maximum over one third of a pitch, so that with a horizontal arrangement of the hollowing tool 1 the cuttings channel 6 opens downwards when the finished depth of bore is attained. This is shown in FIG. 1 by the dot-and-dash line W. When the finished depth of bore is attained that part of the hollowing tool lying to the left of the line is within the bore, the part lying to the right of the line is, however, outside the bore.

In this arrangement it is also advantageous that the cuttings channel 6 should run flat, i.e. become shallow and terminate, at the rear end of the neck part 2 close to the clamping part 3 as shown by the dashed line. In this way it is ensured that the moment of resistance of the neck part is greatest at its rear end, where the greatest bending moment also appears.

In order to promote the removal of cuttings the surface of the cuttings channel 6 should be as smooth as possible which may advantageously be achieved by grinding.

A favorable removal of cutting is brought about when the gradient angle α of the cuttings channel 6 is about 70° to 80°, and preferably 75°.

The hollowing tool 1', illustrated in FIG. 5, differs only in the somewhat different arrangement of the cutting plate 4. In such an arrangement of the cutting plate, well-known in itself, the tool is suitable for boring out blind holes and for facing down.

In place of the interchangeable multiple-cutting cutting plate it is also possible, where necessary, for the cutting plate to be soldered in a known manner. Interchangeable cutting plates are, however, to be preferred.

The hollowing tool according to the invention is particularly suitable for hollowing out bores with small diameters of about 8 to 20 mm. Where necessary, the design according to the invention is also suitable for hollowing tools intended for working bores of larger diameter, but the problem of stability is not of such great importance in tools of this type.

A further advantageous example of embodiment of the hollowing tool according to the invention is illustrated in FIGS. 6 to 8. In this tool a cuttings breaker 8 is mounted on the upper side of the cutting plate 4. The fixing screw 5a which passes through the cuttings breaker 8 and the cutting plate 4 fixes both parts on to the neck part 2. A cuttings channel 6 is arranged close to the cuttings breaker 8 or the cutting plate 4, the design of this channel being similar to that in the previous example of embodiment.

The cuttings breaker extends up to close above the cutting point 4a and, on its longitudinal side 8a running in the axial direction opposite to the cutting point, it has a cuttings breaking channel 9 parallel to the axis and opening towards the cutting plate 4 and the cutting point 4a. As can be seen from the dashed lines in FIGS. 6 and 7, the cross-section of the cuttings breaking channel 9 increases in width in the direction of the cuttings channel 6. The cuttings breaking channel advantageously has an approximately semicircular cross-section opening towards the cutting plate 4. In order to ensure as free passage of the cuttings through the cuttings breaking channel as is possible a slit is provided between the longitudinal side 8a and the cutting plate 4 and extends over the whole length of this channel. The external contour of the cuttings breaker 8 is of essentially semicylindrical form with a radius equal to the radius R of the neck part 2. The front face 8b of the cuttings breaker stands about 0.3 to 0.5 mm back from the cutting plate 4.

The object of the cuttings breaker is to break the cuttings sheared off by the cutting point 4a, which are deflected upwards from the cutting surface of the cutting plate. This occurs because the deflected cuttings strike against the back wall and the upper side of the channel 8 and are broken by the sharp bending. The broken cuttings are then pushed further along inside the cuttings breaking channel 9 by the cuttings which follow them until they reach the cuttings channel 6, through which they then slide out backwards from the bore of the tool. On account of the breaking up of the sheared-off cuttings into separate short pieces it is possible to prevent the cuttings, which would otherwise have the form of spiral springs, from building up in the cuttings channel 6 and then perhaps rubbing against the wall of the bore or even being dragged between the bore and the hollowing tool. The cross-section of the cuttings breaking channel, and in particular the distance of its upper side from the surface of the cutting plate is about 0.5 to 1.5 mm according to the feed or the thickness of the cuttings of the hollowing tool, for bore diameters of between 8 and 20 mm. The greater is the feed or the thickness of the cuttings the greater must this distance be.

We claim:

1. A boring tool for working a bore of small diameter in a workpiece comprising:

a shaft of circular cross-section having a clamping part for supporting the tool and a neck part extending from the clamping part and terminating in a foward end;

a cutting plate having cutting points, said cutting plate being completely within the cross-section of said neck part except for minimal projection of a single said cutting point sideways beyond the periphery of said neck part, and means eccentrically locating and removably affixing said cutting plate in snugly recessed relation in said forward end of said neck part for interchanging of cutting plates and replacing of a used cutting point with another cutting point by reorientation of said cutting plate;

a semicircular cross-section cuttings channel in the peripheral surface of said neck part, said cuttings channel opening forwardly of the neck part at and in communication with said cutting plate, said cuttings channel extending rearwardly toward said clamping part and being spiralled in the direction of rotation and feed of the workpiece with respect to the boring tool, the spiralling of said cuttings channel approaching, at maximum, one-third of a pitch, the surface of the cuttings channel being smoothly ground, the angle of pitch (α) of said cuttings channel being about 70° to 80°, the boring tool having only a single cutting plate, the only structure protecting laterally from said neck part to contact the wall of the bore being said single cutting point of said cutting plate, said neck part having only a single said cuttings channel and having, intermediate the ends of said cuttings channel, a cross-section generally of half-moon shape.

2. The boring tool of claim 1, in which the laterally central portion of the semicircular section, spiralled cuttings channel lies adjacent the central axis of said neck part, in the longitudinally central portion of such channel.

3. The boring tool of claim 2, wherein the longitudinal extent of said spiralled cuttings channel somewhat exceeds the depth of a workpiece bore to be worked by the tool, the cutting plate being arranged substantially horizontally on said neck part with the adjacent part of said cuttings channel opening upwardly and sidewardly toward said cutting point, the upper face of said cutting plate being exposed, the cuttings channel spiraling rearwardly and downwardly along the side of said neck part from which said cutting point extends, and facing substantially downwardly at its rearward end, so as to rearwardly channel cuttings from the cutting plate with the assistance of gravity and drop same downwardly from said neck portion at the outer end of the workpiece and immediately adjacent the rear end of the cuttings channel when the finished depth of bore has been attained.

4. The boring tool of claim 3, in which the cuttings channel becomes shallow and terminates at the rear end thereof adjacent said clamping part.

5. The boring tool of claim 2, in which the cutting point projects no more than about ½ mm. beyond the circular cross-section of said neck part, said boring tool being arranged for producing relatively small diameter bores in the range of about 8 to 20 mm.

6. The boring tool of claim 5, in which said gradient angle ($\alpha$) is 75°.

7. The boring tool of claim 2, in which, as seen from the forward end of said boring tool, the top surface of said cutting plate lies in horizontal diametral plane of said neck part and extends from said cutting point horizontally into the center portion of said neck part, the front end of said semicircular cross-section spiral cuttings channel having one side extending upwardly substantially from said horizontal diametral plane and its other side cut away to provide a planar, decklike surface lying in said horizontal diametral plane of said neck part, said deck surface extending radially inward of said neck part beyond said cutting plate and extending rearward along said neck beyond said cutting plate, the face of said semicircular cross-section cuttings channel angling downwardly from the rear edge of said deck surface as it spirals rearwardly therefrom, the forward portion of said deck surface having a recess opening forwardly through the front end of said neck and shaped to snugly receive said cutting plate with a minor front edge portion of said cutting plate overhanging forwardly beyond said recess, said cutting point being the radially outer tip of said cutting plate front edge portion, the top of said cutting plate being flush with the top of said deck surface such that chips from said cutting point pass rearwardly along the top of said cutting plate and deck surface to reach the semicircular cross-section portion of said spiral cuttings channel.

8. The boring tool of claim 7, in which said cutting plate is triangular in plan, with the innermost side thereof parallel to the axis of said neck part and located near the edge of said deck surface, the remaining two sides of said cutting plate converging laterally outward to said cutting point such that the latter slightly overhangs the peripheral surface of said neck part.

9. The boring tool of claim 7, in which said cutting plate is triangular in plan and has one side approximately parallel to the adjacent edge of said spiral channel and extending slightly thereinto, the front side of said triangular cutting plate paralleling a diametral plane of said neck part and extending from the front end of said one side of said cutting plate to said cutting point, the remaining side of said triangular cutting plate extending transverse to the spiral axis of said channel.

10. The boring tool of claim 2, in which the periphery of said neck part, outside said semicircular channel and for the length of said channel and circumferentially from one channel edge to the other, is smoothly circular and without raised ridges, only said single cutting point extending radially beyond the smooth cylindrical periphery of said neck part.

11. A boring tool for working a workpiece bore of small diameter, comprising:
a shaft of circular cross-section comprising a clamping part for supporting said boring tool and a neck part extending forwardly from said clamping part and having a free forward end for penetrating the workpiece bore;
a cutting plate mounted on said forward free end of said neck part and having a cutting point which projects sidewardly beyond said neck part, said cutting plate being completely within the circular cross-section of said neck part except for said projecting cutting point, said neck part having a channel for cuttings extending rearwardly from said cutting plate, said channel being spiralled in the direction of rotation and feed of the workpiece with respect to said boring tool, said cuttings channel having a semicircular cross-section;
a cuttings breaker mounted on the upper side of said cutting plate and extending laterally to a location close above said cutting point, said cuttings breaker having a longitudinal side adjacent said cutting point and extending axially with respect to said neck part and having a cuttings breaking channel running parallel to the axis of said neck part at said longitudinal side and opening toward said cutting plate and said cutting point.

12. The boring tool of claim 11, in which the cross-section of said cuttings breaking channel widens axially from its forward end to its rear end, with the widened rear end of such cuttings breaking channel opening into said spiral cuttings channel.

13. The boring tool of claim 12, in which said cuttings breaking channel is of approximately semicircular cross-section.

14. The boring tool of claim 12, in which the cuttings breaker channel opens laterally through a slit which extends the entire length of said cuttings breaker, said longitudinal side of said cuttings breaker and said cutting plate being opposed across said slit.

15. The boring tool of claim 11, in which the external contour of the cuttings breaker is substantially semicylindrical with the radius corresponding to the radius of said neck part, said cuttings breaker substantially filling the forward portion of said cuttings channel and substantially completing the circular cross-section of said neck part adjacent the front end of the latter.

* * * * *